(12) United States Patent
Oguchi et al.

(10) Patent No.: US 7,684,339 B2
(45) Date of Patent: Mar. 23, 2010

(54) COMMUNICATION CONTROL SYSTEM

(75) Inventors: Naoki Oguchi, Kawasaki (JP); Tetsumei Tsuruoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 461 days.

(21) Appl. No.: 11/602,688

(22) Filed: Nov. 21, 2006

(65) Prior Publication Data

US 2007/0263548 A1    Nov. 15, 2007

(30) Foreign Application Priority Data

May 15, 2006    (JP) .............................. 2006-135617

(51) Int. Cl.
*H04L 12/28* (2006.01)
(52) U.S. Cl. .................. 370/248; 370/392; 370/401
(58) Field of Classification Search .............. 370/351, 370/395.5, 401, 248, 255; 709/238
See application file for complete search history.

(56) References Cited

U.S. PATENT DOCUMENTS

2003/0079144 A1* 4/2003 Kakemizu et al. ........... 713/200
2006/0291446 A1* 12/2006 Caldwell et al. ............ 370/351
2007/0047446 A1* 3/2007 Dalal et al. ................. 370/237
2007/0086429 A1* 4/2007 Lawrence et al. ........... 370/351

FOREIGN PATENT DOCUMENTS

| JP | 2000-209264 | 7/2000 |
| JP | 2003-134145 | 5/2003 |
| JP | 2003-273907 | 9/2003 |

* cited by examiner

*Primary Examiner*—William Trost, IV
*Assistant Examiner*—Emmanuel Maglo
(74) *Attorney, Agent, or Firm*—Katten Muchin Rosenman LLP

(57) ABSTRACT

A community control server stores in a community defining table, data of a correspondence between Interior Gateway Protocol (IGP) routers that are connected to a community and another community. The community control server collects prefix data that is included in routing information that is received by the IGP routers and identification data of the IGP routers. Based on the community defining table and the identification data, the community control server detects a community corresponding to a prefix. Upon receiving data of whether to transmit the routing information in the form of the permission to distribute them between communities, based on data of the community the community control server determines the prefix corresponding to the source community and transmits the prefix data to the IGP routers.

7 Claims, 19 Drawing Sheets

POLICY DEFINING TABLE
24a

| POLICY NAME | CONTENTS |
|---|---|
| Com1 | Put 10:1 to 20:1<br>Put 20:1 to 10:1 |
| Com2 | Put 10:2 to 30:1<br>Put 30:1 to 10:2 |

COMMUNITY DEFINING TABLE
24b

| COMMUNITY NAME | POSITION |
|---|---|
| 10:1 | ROUTER 1, IF-0 |
| 10:2 | ROUTER 1, IF-1 |
| 20:1 | ROUTER 3, IF-1 |
| 30:1 | ROUTER 4, IF-1 |

PREFIX CONTROL TABLE
24c

| COMMUNITY NAME | PREFIX | RECORDING TIME |
|---|---|---|
| 10:1 | prefix1<br>prefix2<br>prefix3<br>prefix4 | 2006.3.3 12:24:17<br>2006.3.3 12:24:17<br>2006.3.3 12:24:17<br>2006.3.3 12:24:17 |
| 10:2 | prefix5<br>prefix6<br>prefix7<br>prefix8 | 2006.3.2 15:24:23<br>2006.3.2 15:24:23<br>2006.3.2 17:52:25<br>2006.3.2 19:53:25 |
| 20:1 | prefixA1<br>prefixA2 | 2006.3.5 9:36:56<br>2006.3.5 9:36:56 |
| 30:1 | prefixB1<br>prefixB2 | 2006.3.3 17:09:52<br>2006.3.3 18:41:15 |

FIG.6

FILTER CONTROL TABLE 24d

| ROUTER NAME | INTERFACE | FILTER RULE | FILTER GENERATING POLICY |
|---|---|---|---|
| ROUTER 1 | IF-0 | prefixA1 accept<br>prefixA2 accept<br>All deny | Com1<br>Com1<br>default |
| | IF-1 | prefixB1 accept<br>prefixB2 accept<br>All deny | Com2<br>Com2<br>default |
| | IF-2 | prefix1 accept<br>prefix2 accept<br>prefix3 accept<br>prefix4 accept<br>prefix5 accept<br>prefix6 accept<br>prefix7 accept<br>prefix8 accept<br>All deny | Com1<br>Com1<br>Com1<br>Com1<br>Com2<br>Com2<br>Com2<br>Com2<br>default |
| ROUTER 3 | IF-0 | prefixA1 accept<br>prefixA2 accept<br>All deny | Com1<br>Com1<br>default |
| | IF-1 | prefix1 accept<br>prefix2 accept<br>prefix3 accept<br>prefix4 accept<br>All deny | Com1<br>Com1<br>Com1<br>Com1<br>default |
| ROUTER 4 | IF-0 | prefixB1 accept<br>prefixB2 accept<br>All deny | Com2<br>Com2<br>default |
| | IF-1 | prefix5 accept<br>prefix6 accept<br>prefix7 accept<br>prefix8 accept<br>All deny | Com2<br>Com2<br>Com2<br>Com2<br>default |

PREFIX FILTER TABLE
12a

INSPECTION TARGET
PACKET TABLE
12c

FIG.10

SUMMARY REPORT MESSAGE 40

| ROUTER | ROUTER 3 |
|---|---|
| NUMBER OF MESSAGES | 4 |
| PATH 1 RECEIVING INTERFACE IF | IF-0 |
| PATH 1 PREFIX | prefix1 |
| PATH 2 RECEIVING INTERFACE IF | IF-0 |
| PATH 2 PREFIX | prefix2 |
| PATH 3 RECEIVING INTERFACE IF | IF-0 |
| PATH 3 PREFIX | prefix3 |
| PATH 4 RECEIVING INTERFACE IF | IF-0 |
| PATH 4 PREFIX | prefix4 |

FIG.14

ROUTER-INTERFACE CONTROL TABLE 24e

| ROUTER NAME | INTERFACE NAME | INTERFACE ADDRESS |
|---|---|---|
| ROUTER 1 | IF-0<br>IF-1<br>IF-2 | 133.160.10.1<br>134.150.10.1<br>10.25.160.1 |
| ROUTER 2 | IF-0<br>IF-1<br>IF-2 | 10.25.160.2<br>10.25.170.1<br>10.25.180.1 |
| ROUTER 3 | IF-0<br>IF-1 | 10.25.170.2<br>10.27.100.1 |
| ROUTER 4 | IF-0<br>IF-1 | 10.25.180.2<br>10.27.110.1 |

FIG.15

TRANSIT ROUTER MANAGEMENT TABLE 24f

| SRC COMMUNITY | DST COMMUNITY | PATH ROUTER | INTERFACE |
|---|---|---|---|
| 10:1 | 20:1 | ROUTER 3<br>ROUTER 2<br>ROUTER 1 | --<br>IF-1<br>IF-2 |
| 10:2 | 30:1 | ROUTER 4<br>ROUTER 2<br>ROUTER 1 | --<br>IF-2<br>IF-2 |
| 20:1 | 10:1 | ROUTER 1<br>ROUTER 2<br>ROUTER 3 | --<br>IF-0<br>IF-0 |
| 30:1 | 10:2 | ROUTER 1<br>ROUTER 2<br>ROUTER 4 | --<br>IF-0<br>IF-0 |

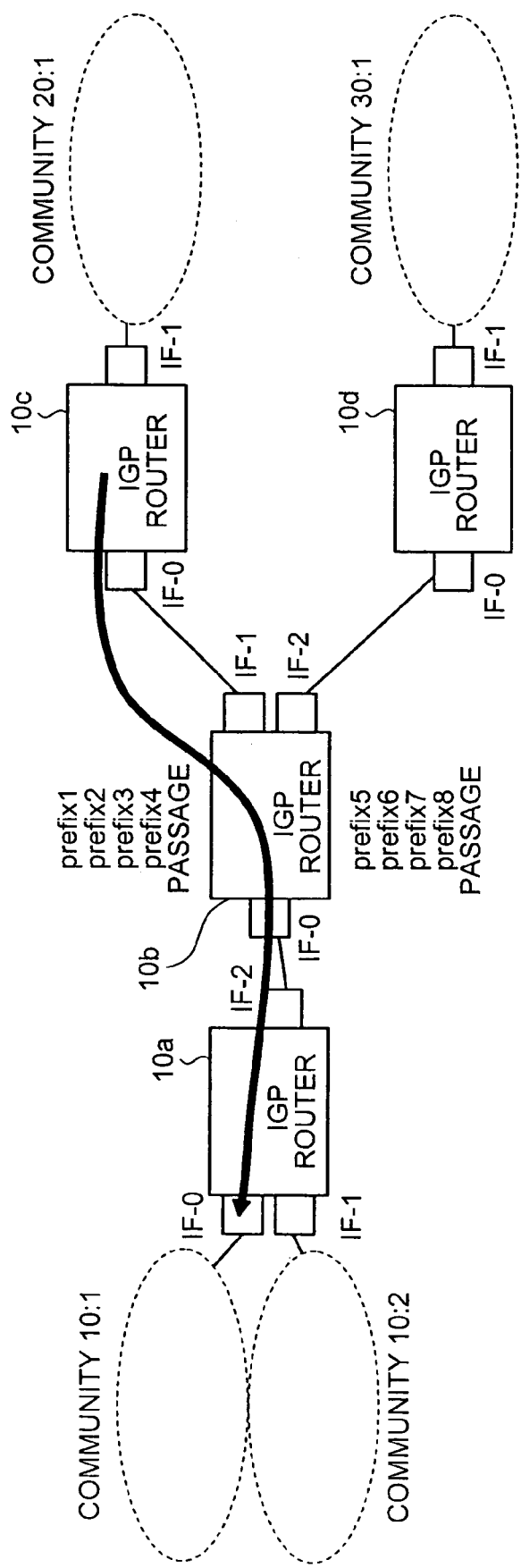

FIG.17

TRACE-ROUTE
EXECUTION RESULT
60

```
traceroute 133.160.10.1

■        20 ms      aaa.bb.jp 10.25.170.1
■        30 ms      ccc.bb.jp 10.25.160.1

Trace complete
```

FIG. 18

FILTER CONTROL TABLE 24d

| ROUTER NAME | INTERFACE | FILTER RULE | FILTER GENERATING POLICY |
|---|---|---|---|
| ROUTER 1 | IF-0 | prefixA1 accept<br>prefixA2 accept<br>All deny | Com1<br>Com1<br>default |
| | IF-1 | prefixB1 accept<br>prefixB2 accept<br>All deny | Com2<br>Com2<br>default |
| | IF-2 | prefix1 accept<br>prefix2 accept<br>prefix3 accept<br>prefix4 accept<br>prefix5 accept<br>prefix6 accept<br>prefix7 accept<br>prefix8 accept<br>All deny | Com1<br>Com1<br>Com1<br>Com1<br>Com2<br>Com2<br>Com2<br>Com2<br>default |
| ROUTER 2 | IF-0 | prefixA1 accept<br>prefixA2 accept<br>prefixB1 accept<br>prefixB2 accept<br>All deny | Com1<br>Com1<br>Com2<br>Com2<br>default |
| | IF-1 | prefix1 accept<br>prefix2 accept<br>prefix3 accept<br>prefix4 accept<br>All deny | Com1<br>Com1<br>Com1<br>Com1<br>Default |
| | IF-2 | prefix5 accept<br>prefix6 accept<br>prefix7 accept<br>prefix8 accept<br>All deny | Com2<br>Com2<br>Com2<br>Com2<br>default |
| ROUTER 3 | IF-0 | prefixA1 accept<br>prefixA2 accept<br>All deny | Com1<br>Com1<br>default |
| | IF-1 | prefix1 accept<br>prefix2 accept<br>prefix3 accept<br>prefix4 accept<br>All deny | Com1<br>Com1<br>Com1<br>Com1<br>default |
| ROUTER 4 | IF-0 | prefixB1 accept<br>prefixB2 accept<br>All deny | Com2<br>Com2<br>default |
| | IF-1 | prefix5 accept<br>prefix6 accept<br>prefix7 accept<br>prefix8 accept<br>All deny | Com2<br>Com2<br>Com2<br>Com2<br>default |

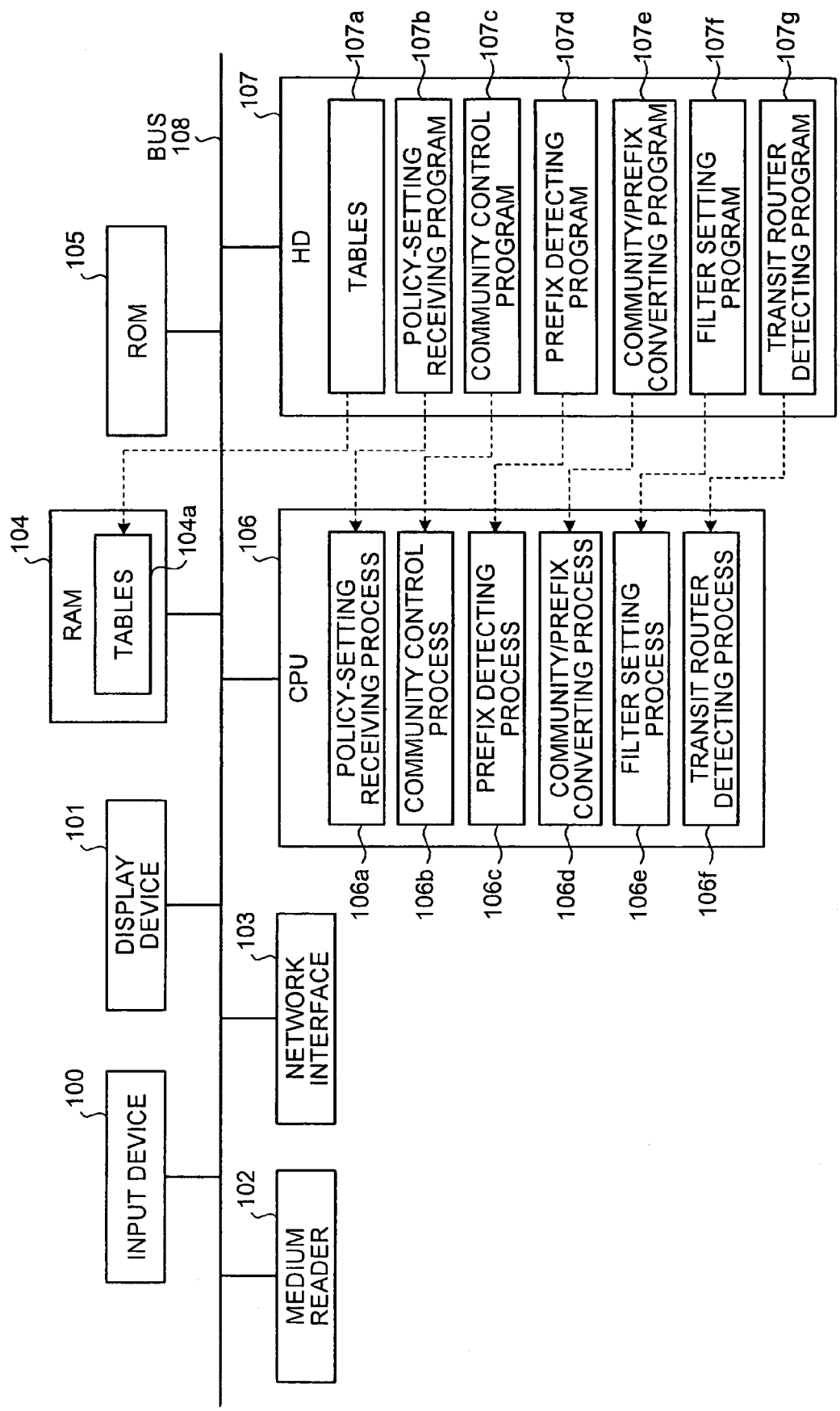

COMMUNICATION CONTROL SYSTEM

BACKGROUND OF THE INVENTION

1. Field of the Invention

The present invention generally relates to a communication control system that controls communication carried out via a network. The present invention, specifically relates to carrying out path control while using a technology such as Internet Gateway Protocol (IGP).

2. Description of the Related Art

Generally, when carrying out data communication between a plurality of networks, communication devices such as a router and a gateway carry out a relay process of data between the networks.

FIG. 20 is a block diagram of an example of the data communication that is carried out between the networks. The data communication is carried out between a network of a company (a company network 1), Internet 2a, an extranet 2b that is constructed between the company and another company, and an experimental network 2c that is temporarily included for experiment of communication.

Thus, when connecting the company network 1 to an external network, a control of the data communication is called for such that the data communication can be carried out only between the company network 1 and a specified network. In a service control network disclosed in Japanese Patent Application Laid-Open No. 2003-134145, a router, which carries out filtering of packets, allocates an Internet Protocol (IP) address to a terminal that is authenticated by a server that carries out authentication of the terminal, and rejects packets from terminals other than the authenticated terminal.

However, in the aforementioned method, the router carries out allocation of the IP address, and if allocation of the IP address is carried out by a network administrator or by a device other than the router, the allocation of the IP address cannot be efficiently detected.

Interior Gateway Protocol (IGP) has been developed as a protocol for carrying out communication control of packets. In the IGP, routing information that includes prefix data is transacted between routers. A prefix indicates a network address that serves as a destination of the packet.

FIG. 21 is a block diagram of a conventional network that uses the IGP. In the network shown in FIG. 21, the routing information (a Routing Information Protocol (RIP) message 6), which includes the prefix data of the networks under IGP routers 3a to 3d, is transacted between the IGP routers 3a to 3d.

The network administrator uses a network control server 4 to carry out filtering of the routing information by setting in the IGP routers 3a to 3d, prefix filters 5a, 5c, and 5d that include a recorded destination address of the routing information that permits transfer. Thus, the network administrator can control distribution of the routing information to the IGP routers 3a to 3d, thereby enabling to restrict the networks that carry out the data communication.

The prefix filters 5a, 5c, and 5d shown in FIG. 21 are set to discard all the routing information by default ("default deny"). If passage of the routing information corresponding to a predetermined prefix "prefix" via a predetermined communication interface "IF" is permitted, data of the prefix and data of the communication interface is recorded in the prefix filters 5a, 5c, and 5d ("permit prefix for IF").

However, even in the conventional network that uses the IGP, if a structure of the network is modified, the network administrator needs to reset the prefix filters 5a, 5c, and 5d, thus requiring considerable efforts. Especially in the network that is externally connected to the company network, the network structure may be modified without a notification to the company, and the network administrator finds it difficult to grasp a prefix that is newly allocated to the network.

Border Gate Protocol (BGP) is used as a path control protocol that can carry out path control without getting affected due to modification of the prefix of the network. In the BGP, using extended community attributes that are installed by a Request For Comments (RFC) 2547, a destination of distribution of the routing information can be restricted to a specific community. A community indicates a group of destination addresses of the networks that are grouped under a BGP router.

FIG. 22 is a block diagram of the conventional network that uses the BGP. In the network shown in FIG. 22, the routing information (a BGP update message 8), which includes the prefix data of the networks under BGP routers 7a to 7c, is transacted between the BGP routers 7a to 7c.

For example, upon receiving the BGP update message 8 from a community, the BGP routers 7a to 7c transmit to the other BGP routers 7a to 7c the BGP update message 8 that includes added community attributes. The community attributes are data of community names ("10:1" etc.) that are recorded in an export target policy of community attributes filters 9a to 9c.

The BGP routers 7a to 7c set as import targets the community attributes that are included in the BGP update message 8, and prior set in the community attributes filters that define passage of the routing information from a path.

Thus, in the network that uses the BGP, data of the community attributes is used instead of the prefix data to set filters that include recorded data related to whether to permit a passage of the routing information. Thus, the destination of distribution of the routing information can be easily restricted.

However, in the conventional technology that uses the BGP, although by using the community attributes path control can be carried out without getting affected due to a modification of the prefix of the network, installing the BGP in the company network significantly increases the cost.

In other words, the BGP is a protocol that is designed for distribution of the routing information across the networks of large scale organizations (Autonomous Systems: AS) such as during communication between providers, and the hierarchical management method of the BGP is not fit for management of a networks within an AS such as the company networks that applies a simple path control policy.

Due to this, operations in the company network are generally carried out using the IGP that is appropriate for a networks within an AS that applies a simple path control policy, and the IGP routers need to be replaced to the BGP routers for using the BGP, thereby significantly increasing the cost.

Thus, a technology needs to be developed that can be used by the network administrator to efficiently carry out complicated path control using the technology such as the IGP that is commonly used in the company network, without resetting the prefix filters even if a structure of the network is modified.

SUMMARY OF THE INVENTION

It is an object of the present invention to at least partially solve the problems in the conventional technology.

According to an aspect of the present invention, a communication control system that includes one or more communication devices and a server in a communication network consisting of a first network that distributes a path message that includes an address of a network that is a destination and identification data of routing communication devices to the network, a second network, and a third network, and wherein the second network relays a communication packet between the first network and the third network, includes a storage unit that stores therein, upon the communication device connected to the first and the second networks receiving the path message from the first network that includes the routing information towards the destination network, a community name that represents a community of destination network addresses that are treated in the same way in the second network and a definition of an addition rule of the routing information that is added to the community; a collecting unit that collects from the communication device, the destination network address that is included in the path message that is received by the communication device from the first network and identification data of the communication device and an interface that have received the path message; a correspondence data generating unit that generates, based on the community name and the addition rule of the routing information added to the community that are stored by the storage unit and data that is collected by the collecting unit, correspondence data of the community name and the destination network address that satisfies the addition rule to the community; a filter conditions generating unit that receives a path distribution rule, of the routing information included in the community towards the third network, as conditions for the community and converts, based on the correspondence data generated by the correspondence data generating unit, the path distribution rule into filter conditions of the routing information in the interface of the communication device that is included in the second network; and a setting unit that sets in the communication device, the filter conditions of the routing information that are generated by the filter conditions generating unit.

According to another aspect of the present invention, a communication control method that causes a communication control system, that includes one or more communication devices and a server in a communication network consisting of a first network that distributes a path message that includes routing information consisting of an address of a network that is a destination and identification data of routing communication devices to the network, a second network, and a third network, and wherein the second network relays a communication packet between the first network and the third network, to carry out communication control, includes collecting from the communication device, the destination network address that is included in the path message that is received by the communication device from the first network and identification data of the communication device and an interface that have received the path message; correspondence data generating that generates, based on data of a community name that represents, upon the communication device connected to the first and the second networks receiving the path message from the first network that includes the routing information towards the destination network, a community of destination network addresses that are treated in the same way in the second network, a prior stored definition of an addition rule of the routing information that is added to the community, and data that is collected at the collecting, correspondence data of the community name and the destination network address that satisfies the addition rule to the community; filter conditions generating that receives a path distribution rule, of the routing information included in the community towards the third network, as conditions for the community and converts, based on the correspondence data generated at the correspondence data generating, the path distribution rule into filter conditions of the routing information in the interface of the communication device that is included in the second network; and setting that sets in the communication device, the filter conditions of the routing information that are generated at the filter conditions generating.

According to still another aspect of the present invention, a communication control program that causes a communication control system, that includes one or more communication devices and a server in a communication network consisting of a first network that distributes a path message that includes routing information consisting of an address of a network that is a destination and identification data of routing communication devices to the network, a second network, and a third network, and wherein the second network relays a communication packet between the first network and the third network, to carry out communication control, the communication control program causing a computer to execute collecting from the communication device, the destination network address that is included in the path message that is received by the communication device from the first network and identification data of the communication device and an interface that have received the path message; correspondence data generating that generates, based on data of a community name that represents, upon the communication device connected to the first and the second networks receiving the path message from the first network that includes the routing information towards the destination network, a community of destination network addresses that are treated in the same way in the second network, a prior stored definition of an addition rule of the routing information that is added to the community, and data that is collected at the collecting, correspondence data of the community name and the destination network address that satisfies the addition rule to the community; filter conditions generating that receives a path distribution rule, of the routing information included in the community towards the third network, as conditions for the community and converts, based on the correspondence data generated at the correspondence data generating, the path distribution rule into filter conditions of the routing information in the interface of the communication device that is included in the second network; and setting that sets in the communication device, the filter conditions of the routing information that are generated at the filter conditions generating.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is an example of contents of a policy defining table 24a;

FIG. 6 is an example of contents of a filter control table 24d;

FIG. 8 is an example of contents of a prefix filter table 12a;

FIG. 10 is an example of contents of a summary report message;

FIG. 14 is an example of contents of a router-interface control table;

FIG. 15 is an example of contents of a transit router management table;

FIG. 16 is a schematic for explaining a trace route;

FIG. 17 is an example of contents of an execution result of the trace route;

FIG. 18 is an example of contents of the filter control table that includes filter data of transit routers;

FIG. 19 is a functional block diagram of a hardware structure of a computer that carries out the communication control process;

DETAILED DESCRIPTION OF THE PREFERRED EMBODIMENTS

Exemplary embodiments of the present invention are explained below with reference to the accompanying drawings.

Figure 1:
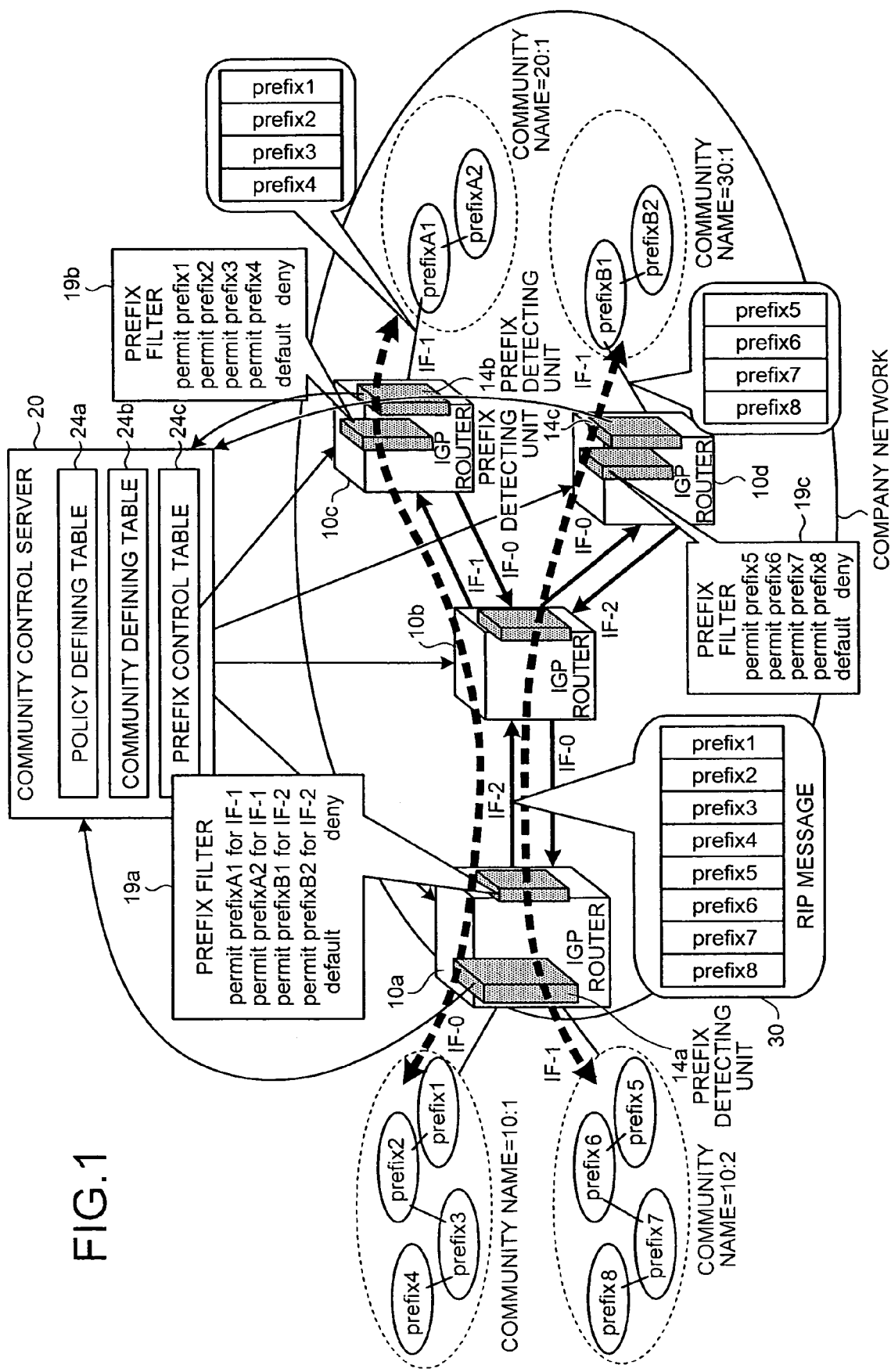
FIG. 1 is a block diagram of a concept of a communication control process according to a first embodiment of the present invention.

A concept of a communication control process according to a first embodiment of the present invention is explained first. FIG. 1 is a block diagram of the concept of the communication control process according to the first embodiment. As shown in FIG. 1, a community having a community name "10:1" and a community having a community name "10:2" are included as networks under an Interior Gateway Protocol (IGP) router 10a. Moreover, a community having a community name "20:1" is included as a network under an IGP router 10c, and a community having a community name "30:1" is included as a network under an IGP router 10d. An IGP router 10b is arranged in a communication path that connects the IGP routers 10a, 10c, and 10d.

The community "10:1" (hereinafter, a community having the community name "10:1" will be called the community "10:1", and similar nomenclature will be used for communities having the community names "10:2", "20:1", and "30:1".) includes networks that correspond to prefixes "prefix 1", "prefix 2", "prefix 3", and "prefix 4".

Similarly, the community "10:2" includes networks corresponding to prefixes "prefix 5", "prefix 6", "prefix 7", and "prefix 8". The community "20:1" includes networks corresponding to prefixes "prefix A1" and "prefix A2". The community "30:1" includes networks corresponding to prefixes "prefix B1" and "prefix B2".

For example, the community "20:1" corresponds to networks that are used by a sales division of a company. The community "30:1" corresponds to networks that are used by a research division of the company. The community "10:1" corresponds to an extranet outside the company network. The community "10:2" corresponds to an experimental network that carries out communication experiments.

The sales division carries out communication using the extranet but does not use the experimental network. The research division carries out communication using the experimental network but does not use the extranet.

Thus, routing information of the extranet should not be transmitted to the network used by the research division and routing information of the experimental network should not be transmitted to the network used by the sales division. Because the routing information includes data that serves as a destination address, a structure of a source network of the routing information and an address of the communication device can be suspected due to unnecessary distribution of the routing information, thereby giving rise to a possibility of attack.

Due to this, the distribution of the routing information must be controlled to ensure that the routing information of the extranet is distributed only to the network of the sales division and the routing information of the experimental network is distributed only to the network of the research division.

As shown in FIG. 1, a community control server 20 is connected to each of the IGP routers 10a to 10d via the network. The community control server 20 sets in the IGP routers 10a to 10d conditions for passage and discarding of the routing information.

To be specific, the community server 20 receives from a network administrator a setting of a community that permits distribution of the routing information by the IGP routers 10a to 10d, and stores the received setting as a policy defining table 24a.

Figure 2:

FIG. 2 is an example of contents of the policy defining table 24a. As shown in FIG. 2, the policy defining table 24a stores therein data of a policy name and content. The policy name is a name for identifying each policy that is set. The content is setting content of the community that permits distribution of the routing information. "Put x to y" indicates that a distribution of the routing information from a community "x" to a community "y" is permitted.

The community control server 20 receives from the network administrator an input of data of communication interfaces of the IGP routers 10a to 10d that include the connected communities, and stores the received data as a community defining table 24b.

Figure 3:
FIG. 3 is an example of contents of a community defining table 24b.

FIG. 3 is an example of contents of the community defining table 24b. As shown in FIG. 3, the community defining table 24b stores therein data of a community name and a position. The community name is a name of the defined community. The position includes data of the communication interfaces of the IGP routers 10a to 10d that connect to the defined community.

In the example shown in FIG. 3, "router 1" indicates the IGP router 10a. The community "10:1" connects to a communication interface "IF-0" of the IGP router 10a, and the community "10:2" connects to a communication interface "IF-1" of the IGP router 10a.

Similarly, "router 3" indicates the IGP router 10c. The community "20:1" connects to the communication interface "IF-1" of the IGP router 10c. "Router 4" indicates the IGP router 10d. The community "30:1" connects to the communication interface "IF-1" of the IGP router 10d.

In the following explanation, "router 1", "router 2", "router 3", and "router 4" indicate the IGP router 10a, the IGP router 10b, the IGP router 10c, and the IGP router 10d respectively.

Further, the community control server 20 receives the prefix data that is detected from a Routing Information Protocol (RIP) message 30 by prefix detecting units 14a to 14c of the IGP routers 10a to 10d. The received prefix data also includes data that indicates the communication interface that is used by the IGP routers 10a to 10d to receive the RIP message 30. The RIP message 30 includes routing information consisting of the prefix data corresponding to the destination network and identification data of the IGP routers 10a to 10d on the path to the destination networks.

The community control server 20 refers to the community defining table 24b and specifies the community corresponding to the communication interface of the detected prefix. The community control server 20 stores data of a correspondence between the specified community and the prefix as a prefix management table 24c.

Figure 4:
FIG. 4 an example of contents of a prefix management table 24c.

FIG. 4 is an example of contents of the prefix management table 24c. As shown in FIG. 4, data of a community name, a prefix, and a recording time is recorded in the prefix management table 24c.

The community name is a name of each community. The prefix is prefix data corresponding to subnets that are included in each community. The recording time is data of a recording date and time when data of the correspondence between the community name and the prefix is recorded.

If a change occurs in the prefix data that is detected from the RIP message 30, the IGP routers 10a to 10d transmit the prefix data to the community control server 20. Upon receiving the prefix data from the IGP routers 10a to 10d, the community control server 20 updates the prefix management table 24c.

The community control server 20 refers to the prefix management table 24c and specifies the prefixes that correspond to the community indicated by the recorded community name in the policy defining table 24a.

The community control server 20 searches from the community defining table 24b, position data of the communication interface that corresponds to the community name, and carries out a process to set prefix filters 19a to 19c in the communication interface, which is specified by the position data, of the IGP routers 10a to 10d.

For example, in the policy defining table 24a shown in FIG. 2, "Put 10:1 to 20:1" of a policy "Com 1" indicates that transmission of the RIP message 30 from the community "10:1" to the community "20:1" is permitted.

Thus, the community control server 20 refers to the prefix management table 24c and detects the prefixes "prefix 1", "prefix 2", "prefix 3", and "prefix 4" corresponding to the community "10:1" that is a source of the RIP message 30.

The community control server 20 refers to the community defining table 24b and detects a position "router 3, IF-1" corresponding to the community "20:1" that is a destination of the RIP message 30.

Next, the community control server 20 sets the prefix filter 19b in the communication interface "IF-1" of the IGP router 10c ("router 3") that corresponds to the detected position such that the prefix filter 19b permits the passage of only the RIP message 30 corresponding to the prefixes "prefix 1", "prefix 2", "prefix 3", and "prefix 4".

Similarly, the community control server 20 refers to the community defining table 24b and detects a position "router 1, IF-0" corresponding to the community "10:1" that is a source of the RIP message 30.

The community control server 20 sets the prefix filter 19a in the communication interface "IF-0" of the IGP router 10a ("router 1") that corresponds to the detected position such that the prefix filter 19a permits the passage of only the RIP message 30 corresponding to the prefixes "prefix 1", "prefix 2", "prefix 3", and "prefix 4".

Similarly, the community control server 20 carries out a similar process for "Put 20:1 to 10:1" of the policy "Com 1" and "Put 10:2 to 30:1" and "Put 30:1 to 10:2" of the policy "Com 2" and sets the prefix filters 19a to 19c in the IGP routers 10a, 10c, and 10d such that the prefix filters 19a to 19c permit the passage of only the control data that includes predetermined prefixes.

Thus, in the communication control process according to the first embodiment, the community control server 20 constantly updates and controls data of the correspondence between the community and the prefixes of the subnets included in the community. Upon receiving from the network administrator a specification of the community that permits transmission of the routing information, based on the data of the correspondence the community control server 20 sets the prefix filters 19a to 19c in the IGP routers 10a to 10d. Thus, path control can be efficiently carried out while using a technology such as the IGP that is commonly used in the company network even if a prefix is modified.

Figure 5:
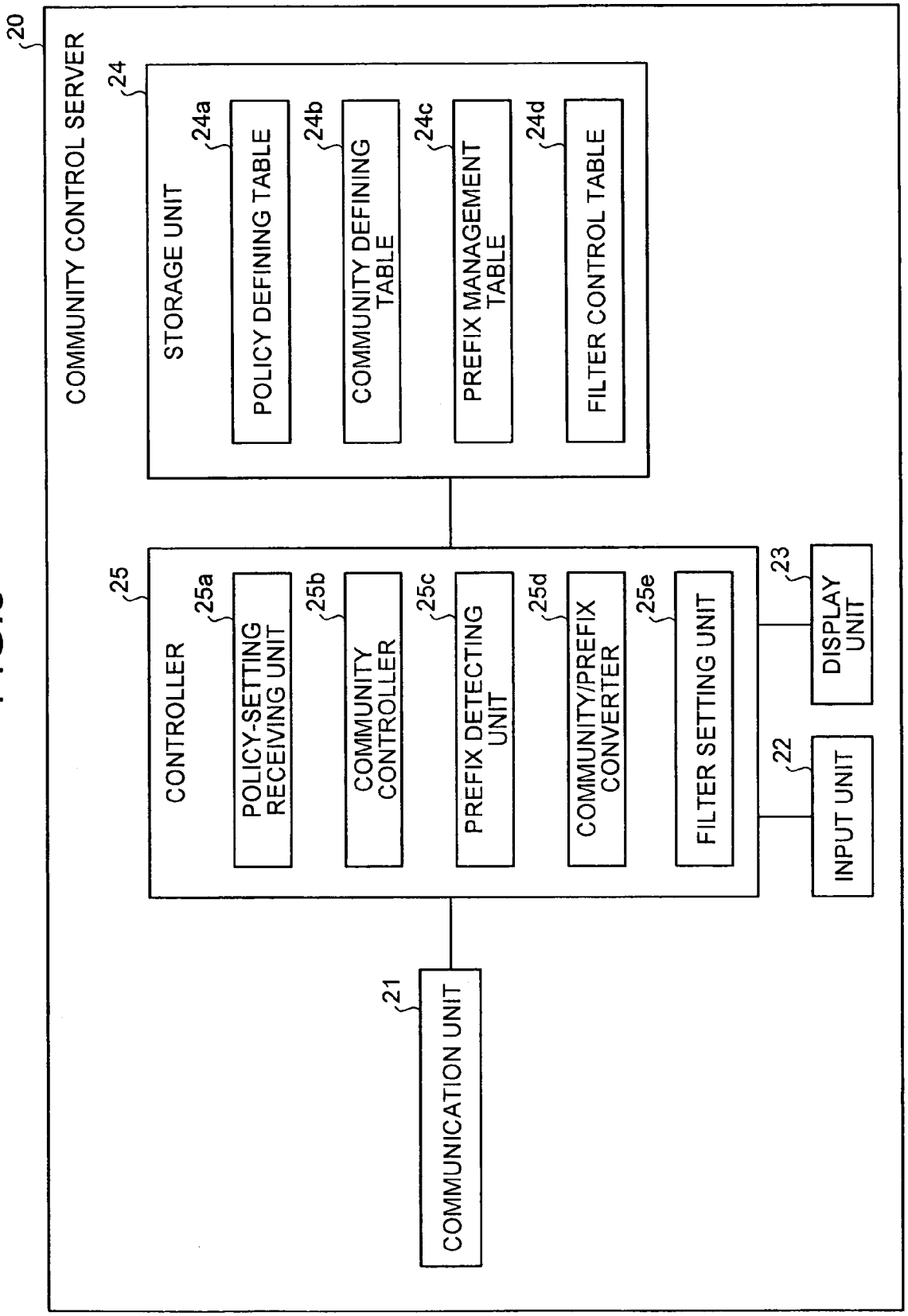
FIG. 5 is a functional block diagram of a functional structure of a community control server according to the first embodiment.

A functional structure of the community control server 20 according to the first embodiment is explained next. FIG. 5 is a functional block diagram of the functional structure of the community control server 20 according to the first embodiment. As shown in FIG. 5, the community control server 20 includes a communication unit 21, an input unit 22, a display unit 23, a storage unit 24, and a controller 25.

The communication unit 21 is a network interface that carries out data communication between the IGP routers 10a to 10d. The input unit 22 is an input device such as a keyboard or a mouse. The display unit 23 is a display device such as a display.

The storage unit 24 is a storage device such as a hard disk device. The storage unit 24 stores therein the policy defining table 24a, the community defining table 24b, the prefix management table 24c, and the filter control table 24d.

The policy defining table 24a, the community defining table 24b, and the prefix management table 24c are explained with reference to FIG. 2, FIG. 3, and FIG. 4 respectively. The filter control table 24d is data that stores setting data of the prefix filters 19a to 19c that are set in the IGP routers 10a to 10d.

FIG. 6 is an example of contents of the filter control table 24d. As shown in FIG. 6, the filter control table 24d stores therein data of a router name, an interface, a filter rule, and a filter generating policy.

The router name indicates a name of the router for setting the prefix filters 19a to 19c. The interface is the communication interface in which the prefix filters 19a to 19c are set. The filter rule is a rule of filtering that is set in each communication interface.

By default, the passage of all the path messages is set to denial ("All deny"). If the routing information includes the prefix data that is permitted to pass, the prefix data is recorded in the filter rule. For example, if the routing information that includes data of the prefix "prefix A1" is permitted to pass, "prefix A1 accept" is recorded in the filter rule.

The filter generating policy is data of the policy name related to generation of each filter rule. The filter generating policy corresponds to the policy name that is recorded in the policy defining table 24a shown in FIG. 2.

Returning to FIG. 5, the controller 25 controls the entire community control server 20 and controls transfer of data between various functioning units of the community control server 20. The controller 25 includes a policy-setting receiving unit 25a, a community controller 25b, a prefix detecting unit 25c, a community/prefix converter 25d, and a filter setting unit 25e.

The policy-setting receiving unit 25a receives from the network administrator an input of setting data of the community that permits distribution of the routing information by the IGP routers 10a to 10d, and stores the received setting data in the storage unit 24 as the policy defining table 24a.

The community controller 25b receives from the network administrator an input of data of the communication interfaces of the IGP routers 10a to 10d that are connected to the communities, and stores the received data in the storage unit 24 as the community defining table 24b.

The prefix detecting unit 25c receives from the IGP routers 10a to 10d, the prefix data that is included in the routing information received by the IGP routers 10a to 10d and data of the communication interface that has received the routing information, and records the received data in the prefix management table 24c.

To be specific, the prefix detecting unit 25c refers to the community defining table 24b, and based on the data of the communication interface received from the IGP routers 10a to 10d, specifies the community name of the community that is connected to the communication interface.

The prefix detecting unit 25c establishes a correspondence between the specified community name and the prefix data received from the IGP routers 10a to 10d and records the prefix data in the prefix management table 24c. Further, the prefix detecting unit 25c records data of the recording time of the prefix data in the prefix management table 24c. The prefix detecting unit 25c discards the recorded prefix data after lapse of a predetermined time period.

The community/prefix converter 25d records in the filter control table 24d data of the prefix filters 19a to 19c that are set in the IGP routers 10a to 10d.

To be specific, the community/prefix converter 25d refers to the prefix management table 24c and converts into the prefix data, the data of the community that permits distribution of the routing information recorded in the policy defining table 24a. The community/prefix converter 25d uses the converted prefix data to generate data of the filter rule and the filter generating policy that are recorded in the filter control table 24d.

Further, the community/prefix converter 25d refers to the community defining table 24b, specifies the IGP routers 10a to 10d and the communication interface for setting the filter rule, and generates data of the router name and the interface that are recorded in the filter control table 24d. Further, the community/prefix converter 25d records in the filter control table 24d, data of the router name, the interface, the filter rule, and the filter generating policy.

The filter setting unit 25e refers to the filter control table 24d, transmits to the IGP routers 10a to 10d data of the filter rules of the prefixes that are set as the prefix filters 19a to 19c, and sets the prefix filters 19a to 19c in the IGP routers 10a to 10d.

Figure 7:
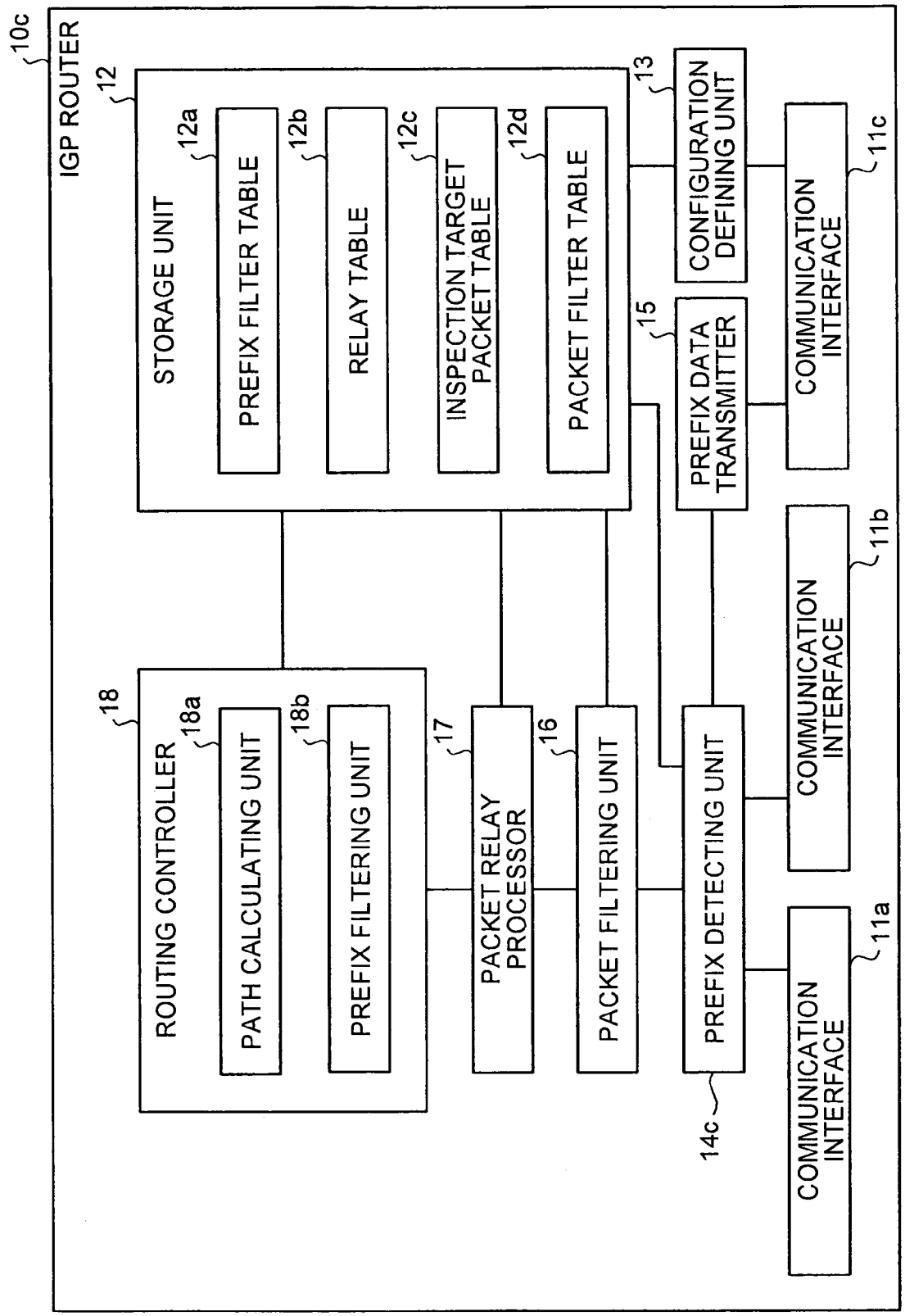
FIG. 7 is a functional block diagram of a functional structure of an IGP router.

A functional structure of the IGP routers 10a to 10d is explained next. FIG. 7 is a functional block diagram of the functional structure of the IGP router 10c. Because the functional structure of the IGP routers 10a, 10b, and 10d is the same as the functional structure of the IGP router 10c, only the functional structure of the IGP router 10c is explained.

As shown in FIG. 7, the IGP router 10c includes communication interfaces 11a to 11c, a storage unit 12, a configuration defining unit 13, a prefix detecting unit 14c, a prefix data transmitter 15, a packet filtering unit 16, a packet relay processor 17, and a routing controller 18.

The communication interfaces 11a to 11c are network interfaces that carry out communication between the IGP router 10c and other devices. The storage unit 12 is a storage device such as a memory. The storage unit 12 includes a prefix filter table 12a, a relay table 12b, an inspection target packet table 12c, and a packet filter table 12d.

Figure 8:

The prefix filter table 12a is stored data of the filter rule that is used to carry out filtering of the routing information based on the prefixes. FIG. 8 is an example of contents of the prefix filter table 12a. As shown in FIG. 8, data of the interface and the filter rule is recorded in the prefix filter table 12a.

The interface indicates data of names of the communication interfaces 11a and 11b that carry out sending and receiving of the routing information and user data. The filter rule is a rule of filtering of the routing information that is set in the communication interfaces 11a and 11b.

According to the filter rule, all the routing information is set to passage denial by default ("All deny"). If the routing information includes the prefix data that is permitted to pass, the prefix data is recorded in the filter rule. For example, if the routing information, which includes data of the prefix "prefix A1", is permitted to pass, "prefix A1 accept" is recorded in the filter rule.

The relay table 12b is a routing table that stores therein data of a correspondence between a destination network during transfer of a packet of the routing information and the user data and the communication interfaces 11a and 11b that are used for transferring the packet to the destination network.

Figure 9:
FIG. 9 is an example of contents of an inspection target packet table.

The inspection target packet table 12c is stored data of the packet that detects the prefix. FIG. 9 is an example of contents of the inspection target packet table 12c. As shown in FIG. 9, data of the interface and the inspected packet is recorded in the inspection target packet table 12c.

The interface indicates data of names of the communication interfaces 11a and 11b that are included in the IGP router 10c. The inspected packet indicates a type of the packet that is inspected. In the example shown in FIG. 9, the inspected packet is set such that the prefix included in "routing message" of the communication interfaces "IF-0" and "IF-1" is detected.

The packet filter table 12d is data of the stored filter rules that are used to carry out filtering of the packets of the user data based on the prefixes. A structure of the packet filter table 12d is similar to the structure of the prefix filter table 12a shown in FIG. 8. The packet filter table 12d stores therein data of the interface that indicates names of the communication interfaces 11a and 11b and the filter rules that are set in the communication interfaces 11a and 11b.

The configuration defining unit 13 receives from the community control server 20 via the communication interface 11c data of the inspected packet that carries out checking of the prefix and data of the filter rule that is set in the communication interfaces 11a and 11b. The configuration defining unit 13 records the received data in the inspection target packet table 12c, the prefix filter table 12a, and the packet filter table 12d.

The prefix detecting unit 14c detects the prefix that is included in the routing message received by the communication interfaces 11a and 11b and the prefix that is included in the user data. Recently, a function of the prefix detecting unit 14c is mounted in many IGP routers.

To be specific, upon detecting the prefix included in the inspected packet that is recorded in the inspection target packet table 12c, the prefix detecting unit 14c stores the data of the detected prefix.

Upon detecting a new prefixes that is not included in the stored prefix data, the prefix detecting unit 14c carries out a process to generate a summary report message that includes data of the new prefix.

FIG. 10 is an example of contents of a summary report message 40. As shown in FIG. 10, data of a router, a number of messages, a path 1 receiving interface, a path 1 prefix, a path 2 receiving interface, a path 2 prefix, a path 3 receiving interface, a path 3 prefix, a path 4 receiving interface, and a path 4 prefix is recorded in the summary report message 40.

The router indicates identification data that is generated by the summary report message 40 for identifying the IGP routers 10a to 10d. The number of messages indicates a number of prefix data that are included in the summary report message 40. In the example shown in FIG. 10, the summary report message 40 includes data of "4" prefixes.

The path 1 receiving interface, the path 2 receiving interface, the path 3 receiving interface, and the path 4 receiving interface are data of the communication interfaces 11a and 11b that receive the routing message that includes the prefix data. The path 1 prefix, the path 2 prefix, the path 3 prefix, and the path 4 prefix are the prefix data that are included in each routing message.

Returning to FIG. 7, upon generation of the summary report message 40 by the prefix detecting unit 14c, the prefix data transmitter 15 transmits the summary report message 40 to the community control server 20.

The packet filtering unit 16 refers to the packet filter table 12d and carries out filtering of the packets of the user data that are received by the communication interfaces 11a and 11b.

Upon receiving of the routing message and the user data by the communication interfaces 11a and 11b, the packet relay processor 17 refers to the relay table 12b, determines the communication interfaces 11a and 11b that transfer the routing message and the user data, and transmits the routing message and the user data via the communication interfaces 11a and 11b. If the destination of the received routing message is the IGP router 10c, the packet relay processor 17 outputs the routing message to the routing controller 18.

The routing controller 18 controls the communication path when carrying out a transaction of the routing message and the user data between the IGP router 10c and the other IGP routers 10a, 10b, and 10d. The routing controller 18 includes a path calculating unit 18a and a prefix filtering unit 18b.

The path calculating unit 18a carries out transaction of the routing message between the IGP router 10c and the other IGP routers 10a, 10b, and 10d, and based on the routing information in the message, records in the relay table 12b, data of a correspondence between the destination network where the packets of the routing information and the user data are transferred, and the communication interfaces 11a and 11b that are used for transferring the packets to the destination network.

The path calculating unit 18a can also receive setting data of the correspondence that is established by the network administrator using a not shown input unit and record the setting data in the relay table 12b.

The prefix filtering unit 18b refers to the prefix filter table 12a and carries out a filtering process to remove, from a message that carries the routing information, the routing information that includes prefixes other than the prefixes recorded in the prefix filter table 12a.

Figure 11:
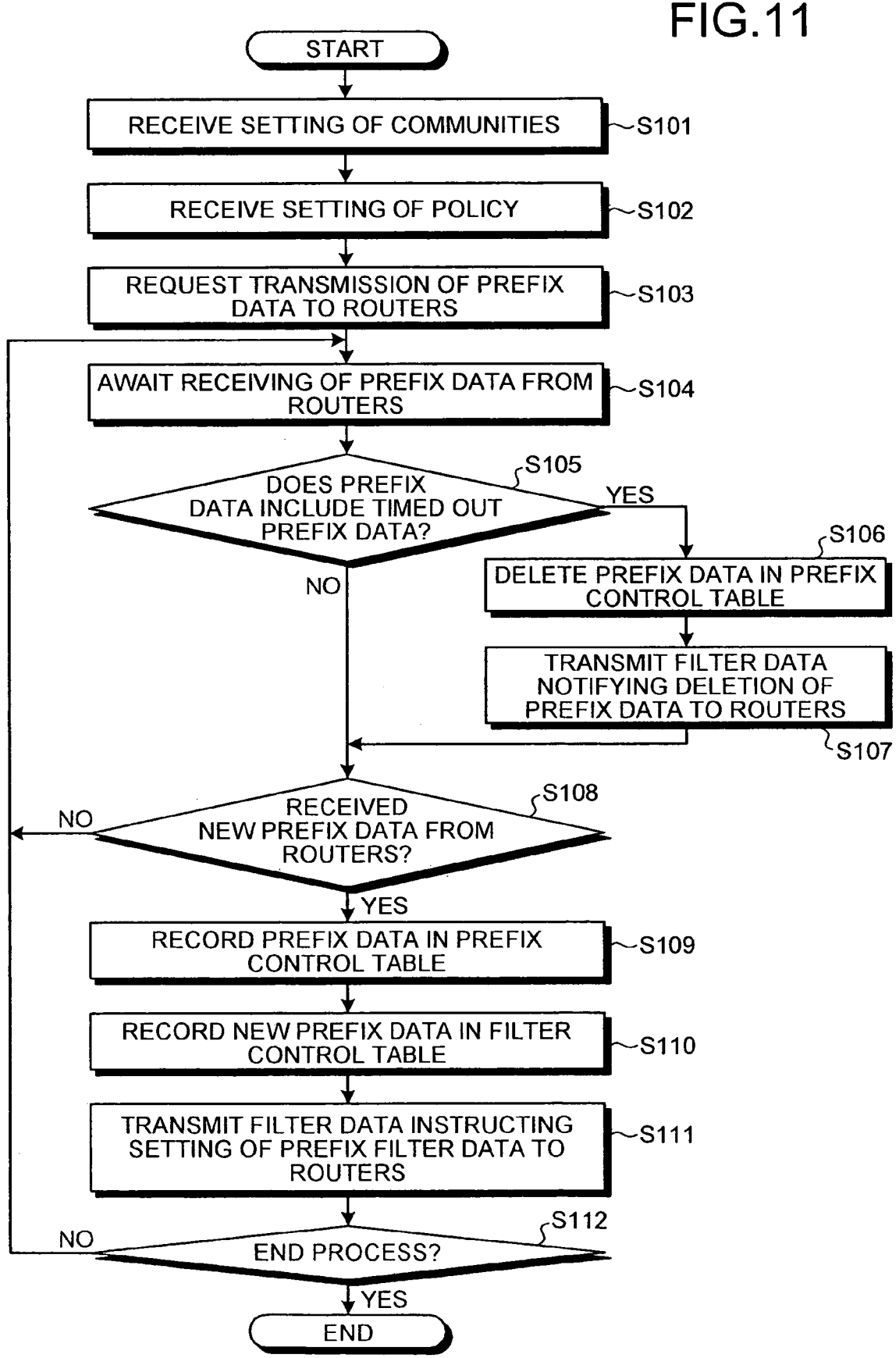
FIG. 11 is a flowchart of a sequence of the communication control process that is carried out by the community control server.

A sequence of the communication control process that is carried out by the community control server 20 is explained next. FIG. 11 is a flowchart of the sequence of the communication control process that is carried out by the community control server 20.

As shown in FIG. 11, first, the community controller 25b of the community control server 20 receives a setting of the communities that is input by the network administrator via the input unit 22 (step S101). To be specific, the community controller 25b receives data of names of the communities and the communication interfaces of the IGP routers 10a to 10d that connect to the community. The community controller 25b records the received data in the community defining table 24b.

Next, the policy-setting receiving unit 25a receives a setting of a filtering policy of the routing information that is input by the network administrator via the input unit 22 (step S102). To be specific, the policy-setting receiving unit 25a receives data of the policy name and the community that permits distribution of the routing information, and records the received data in the policy defining table 24a.

The prefix detecting unit 25c issues a request to start transmission of the prefix data to the IGP routers 10a to 10d (step S103). The prefix data is the summary report message 40 that is explained with reference to FIG. 10.

Next, the prefix detecting unit 25c awaits receiving of the prefix data from the IGP routers 10a to 10d (step S104). Next, the prefix detecting unit 25c refers to the prefix management table 24c and checks if the prefixes recorded in the prefix management table 24c include a timed out prefix (step S105).

To be specific, the prefix detecting unit 25c reads data of the recording time in the prefix management table 24c and checks whether the recording time of a prefix in the prefix management table 24c has exceeded a predetermined time period.

If the prefixes include a timed out prefix (Yes at step S105), the prefix detecting unit 25c deletes the data of the prefix and the recording time from the prefix management table 24c (step S106).

Further, the prefix detecting unit 25c transmits to the IGP routers 10a to 10d the filter data that notifies deletion of the prefix data for deleting the data corresponding to the deleted prefix from the prefix filter table 12a of the IGP routers 10a to 10d (step S107).

By checking the community name corresponding to the prefix that is deleted in the prefix management table 24c, and checking from the community defining table 24b the data of the communication interface of the IGP routers 10a to 10d corresponding to the checked community name, the community control server 20 can specify the IGP routers 10a to 10d for transmitting the filter data.

After step S105 or step S107, the prefix detecting unit 25c checks whether the community control server 20 has received from the IGP routers 10a to 10d data of a new prefix that is not recorded in the prefix management table 24c (step S108).

If the community control server 20 has not received data of a new prefix (No at step S108), the communication control process moves to step S104 and the subsequent process continues. If the community control server 20 has received data of a new prefix (Yes at step S108), the prefix detecting unit 25c records the data of the received prefix in the prefix management table 24c (step S109).

To be specific, the prefix detecting unit 25c refers to the community defining table 24b, extracts data of the communication interfaces of the IGP routers 10a to 10d from the prefix data received from the IGP routers 10a to 10d, and fetches data of the community name corresponding to the extracted data.

Next, the prefix detecting unit 25c carries out a process in the prefix management table 24c to establish a correspondence between the fetched community name and the prefix and to record data of the prefix and the recording time.

Next, the community/prefix converter 25d records in the filter control table 24d the prefix data that is newly received from the IGP routers 10a to 10d (step S110).

To be specific, by referring to the prefix management table 24c the community/prefix converter 25d converts into the prefix data, the data of the community that permits distribution of the routing information recorded in the policy defining table 24a, and generates data of the filter rule and the filter generating policy that are recorded in the filter control table 24d.

Further, the community/prefix converter 25d refers to the community defining table 24b, specifies the IGP routers 10a to 10d and the communication interfaces for setting the filter rule, and generates data of the router name and the interface that are recorded in the filter control table 24d. Next, the community/prefix converter 25d records in the filter control table 24d data of the router name, the interface, the filter rule, and the filter generating policy.

Next, for recording in the prefix filter table 12a of the IGP routers 10a to 10d, data corresponding to the prefix data that is recorded in the filter control table 24d, the filter setting unit 25e transmits to the IGP routers 10a to 10d specified by the router name of the filter control table 24d, the filter data to instruct setting of the prefix filter data (step S111).

Next, the prefix detecting unit 25c checks whether the community control server 20 has received an input to end the communication control process from the network administrator (step S112). If the community control server 20 has not received an input to end the communication control process from the network administrator (No at step S112), the communication control process moves to step S104 and the subsequent process continues. If the community control server 20 has received an input to end the communication control process from the network administrator (Yes at step S112), the communication control process ends.

Figure 12:
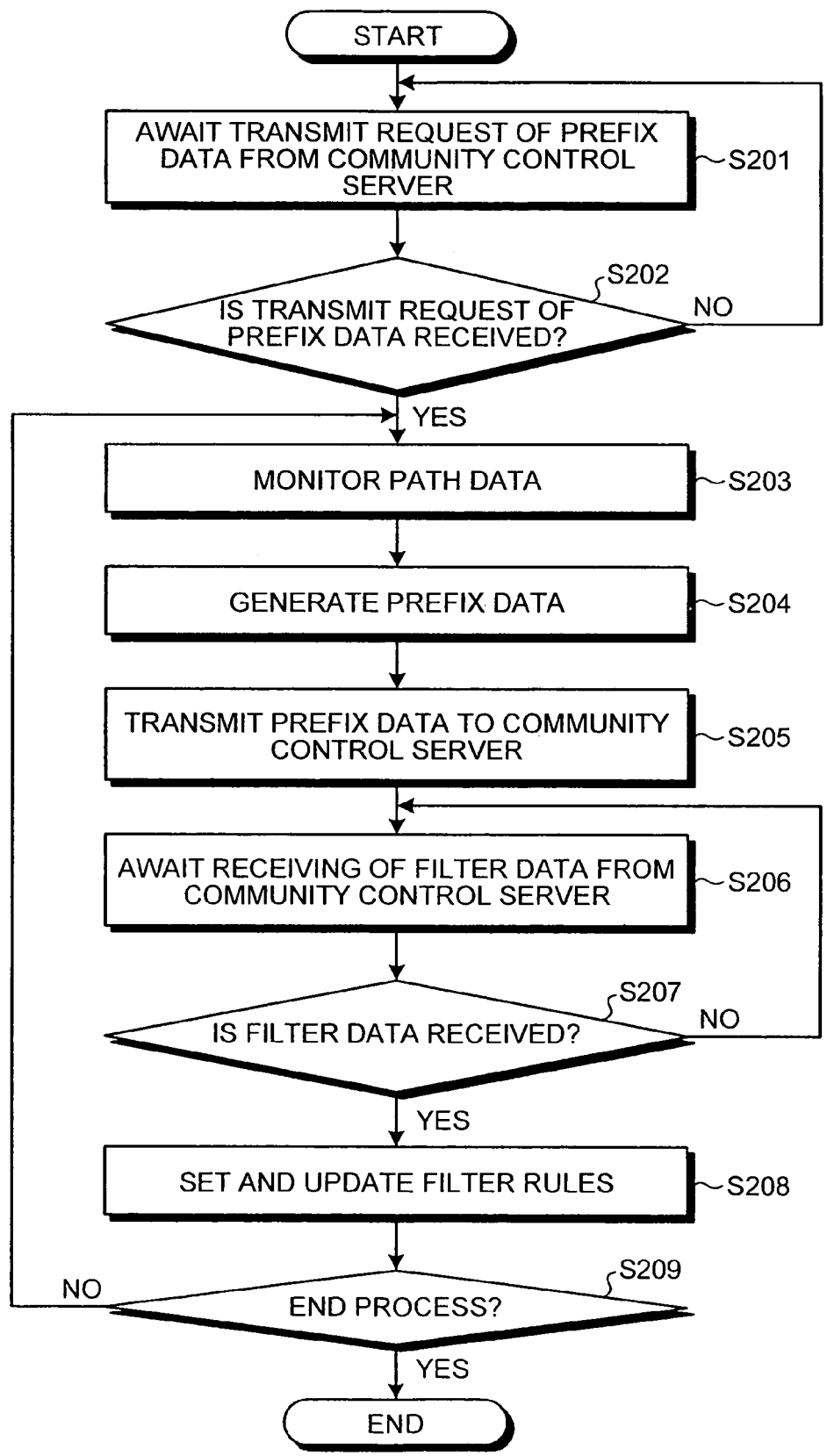
FIG. 12 is a flowchart of the sequence of the communication control process carried out by the IGP router.

A sequence of the communication control process carried out by the IGP router 10c is explained next. FIG. 12 is a flowchart of the sequence of the communication control process carried out by the IGP router 10c.

As shown in FIG. 12, first the configuration defining unit 13 of the IGP router 10c awaits a transmit request of the prefix data from the community control server 20 (step S201), and checks whether the IGP router 10c has received the transmit request of the prefix data (step S202).

If the IGP router 10c has not received the transmit request of the prefix data (No at step S202), the communication control process moves to step S201 and the configuration defining unit 13 awaits the transmit request of the prefix data.

If the IGP router 10c has received the transmit request of the prefix data (Yes at step S202), the prefix detecting unit 14c starts monitoring of the routing information to detect the prefix data that is included in the routing message (step S203).

The prefix data transmitter 15 generates the prefix data for transmission to the community control server 20 (step S204). The prefix data is the summary report message 40 that is explained with reference to FIG. 10.

Next, the prefix data transmitter 15 transmits the prefix data to the community control server 20 (step S205). The configuration defining unit 13 awaits receiving of the filter data from the community control server 20 for recording in the prefix filter table 12a and the packet filter table 12d (step 206), and checks whether the IGP router 10c has received the filter data (step S207).

If the IGP router 10c has not received the filter data (No at step S207), the communication control process moves to step S206 and the configuration defining unit 13 awaits receiving of the filter data. If the IGP router 10c has received the filter data (Yes at step S207), based on the filter data, the configuration defining unit 13 carries out setting and updation of the filter rules in the prefix filter table 12a and the packet filter table 12d (step S208).

Next, the prefix detecting unit 14c checks whether the IGP router 10c has received an input to end the communication control process from the network administrator (step S209). If the IGP router 10c has not received an input to end the communication control process from the network administrator (No at step S209), the communication control process moves to step S203, and the subsequent process continues. If the IGP router 10c has received an input to end the communication control process from the network administrator (Yes at step S209), the communication control process ends.

In the communication control method according to the first embodiment, the prefix detecting unit 14c and the prefix data transmitter 15 are included in the IGP router 10c. However, the prefix detecting unit 14c and the prefix data transmitter 15 can also be included in a separate prefix detecting device other than the IGP router 10c. Thus, a low cost IGP router without the prefix detecting unit 14c and the prefix data transmitter 15 can be used.

The prefix detecting device is connected to the IGP router without the prefix detecting unit 14c and the prefix data transmitter 15. Upon receiving the routing information from the community, the prefix detecting device detects the prefix included in the routing information. The IGP router receives the routing information that is transferred from the prefix detecting device.

The inspection target packet table 12c is stored in a storage unit of the prefix detecting device. Upon the prefix detecting unit 14c detecting the prefixes included in the inspected packets that are recorded in the inspection target packet table 12c, the prefix data transmitter 15 of the prefix detecting device generates the summary report message 40 that includes the detected prefix data, and transmits the summary report message 40 to the community control server 20.

In the first embodiment, the storage unit 24 of the community control server 20 stores as the community defining table 24b, data related to a correspondence between the communities and the IGP routers 10a, 10c, and 10d that are connected to the communities. The prefix detecting unit 25c collects data related to the prefix included in the routing message that is received by the IGP routers 10a, 10c, and 10d and identification data of the IGP routers 10a, 10c, and 10d. Further, based on the data stored in the community defining table 24b, the prefix detecting unit 25c detects the community corresponding to the detected prefix. Upon the policy-setting receiving unit 25a receiving the data of whether to transmit the routing information in the form of the permission to distribute them between communities, based on the community data detected by the prefix detecting unit 25c, the community/prefix converter 25d determines the prefix corresponding to the specified community, and the filter setting unit 25e transmits the prefix filter data that is obtained as the determination result to the IGP routers 10a, 10c, and 10d. Thus, path control can be efficiently carried out while using a technology such as the IGP that is commonly used in the company network even if a prefix of a network is modified.

In the first embodiment, the prefix detecting unit 25c discards the collected prefix data after lapse of the predetermined time period after collection. Thus, by discarding the outdated data, path control based on incorrect data can be prevented.

In the first embodiment, the packet filtering unit 16 of the IGP router 10c receives the prefix data that is transmitted by the community control server 20 and based on the received data carries out filtering of the routing information. Thus, even if data of the destination address is leaked to a third party in any way, transmission of the packets of the user data to the network of the destination address from a network that is not permitted to carry out such a communication can be prevented.

In the first embodiment, the prefix detecting device that is included separately from the IGP router detects the prefix data from the routing message, and the prefix detecting unit 25c of the community control server 20 collects the prefix data that is detected by the prefix detecting device and data of the IGP router that has received the routing message that includes the prefix data. Thus, by separately including the IGP router and the prefix detecting device, the IGP router that does not include a detecting function of the destination address can be used.

In the first embodiment, the prefix filters 19a to 19c are set in the IGP routers 10a, 10c, and 10d that are connected to the communities. However, the prefix filters 19a to 19c can also be set in the IGP router 10b that is included between the IGP routers 10a, 10c, and 10d connected to the communities and that relays the routing message.

Setting the prefix filters 19a to 19c in the IGP routers 10b that is included between the IGP routers 10a, 10c, and 10d connected to the communities is explained in a second embodiment of the present invention. Functioning units that are similar to the functioning units explained in the first embodiment are indicated by the same reference numerals and a detailed explanation is omitted.

Figure 13:
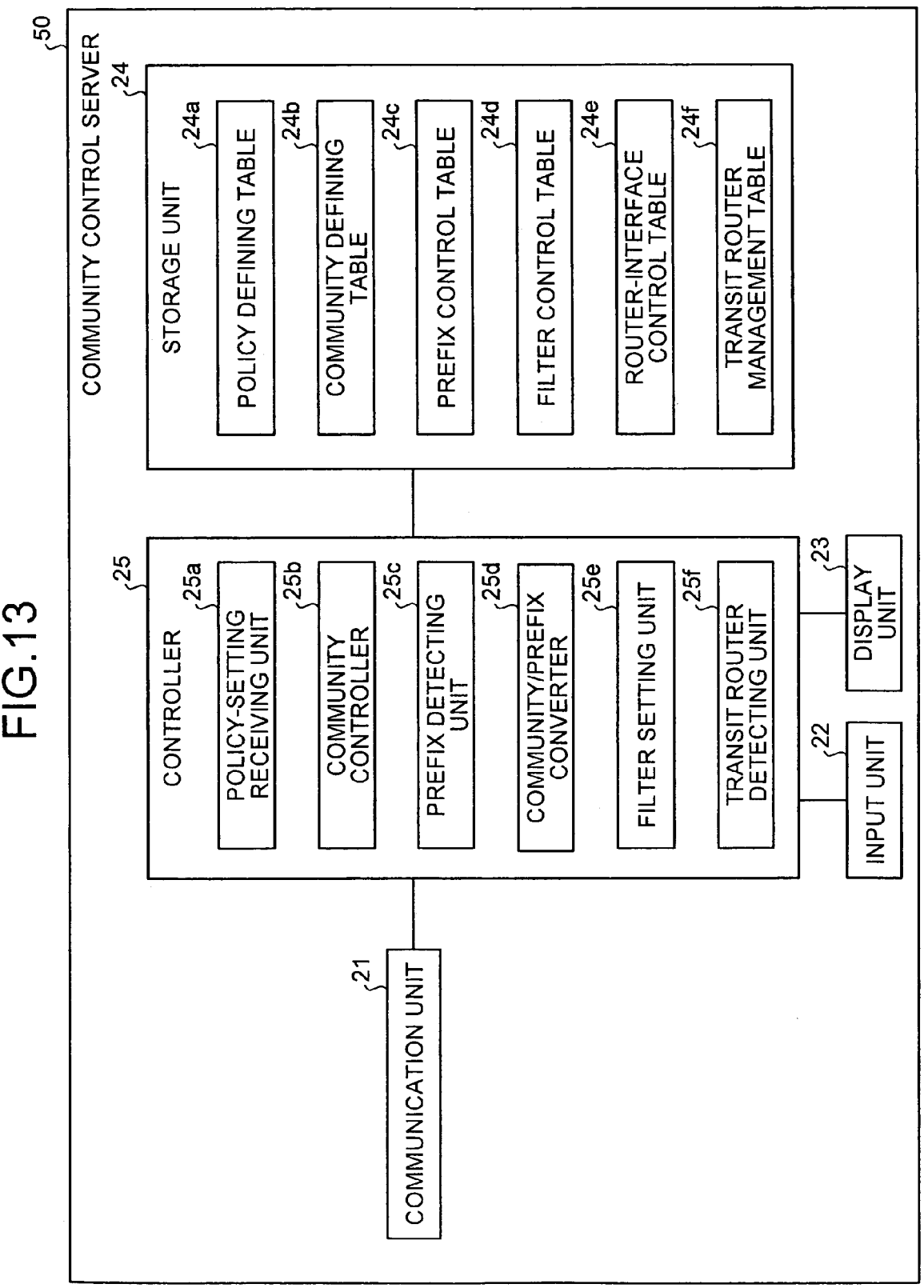
FIG. 13 is a functional block diagram of a functional structure of a community control server according to a second embodiment of the present invention.
Figure 20:
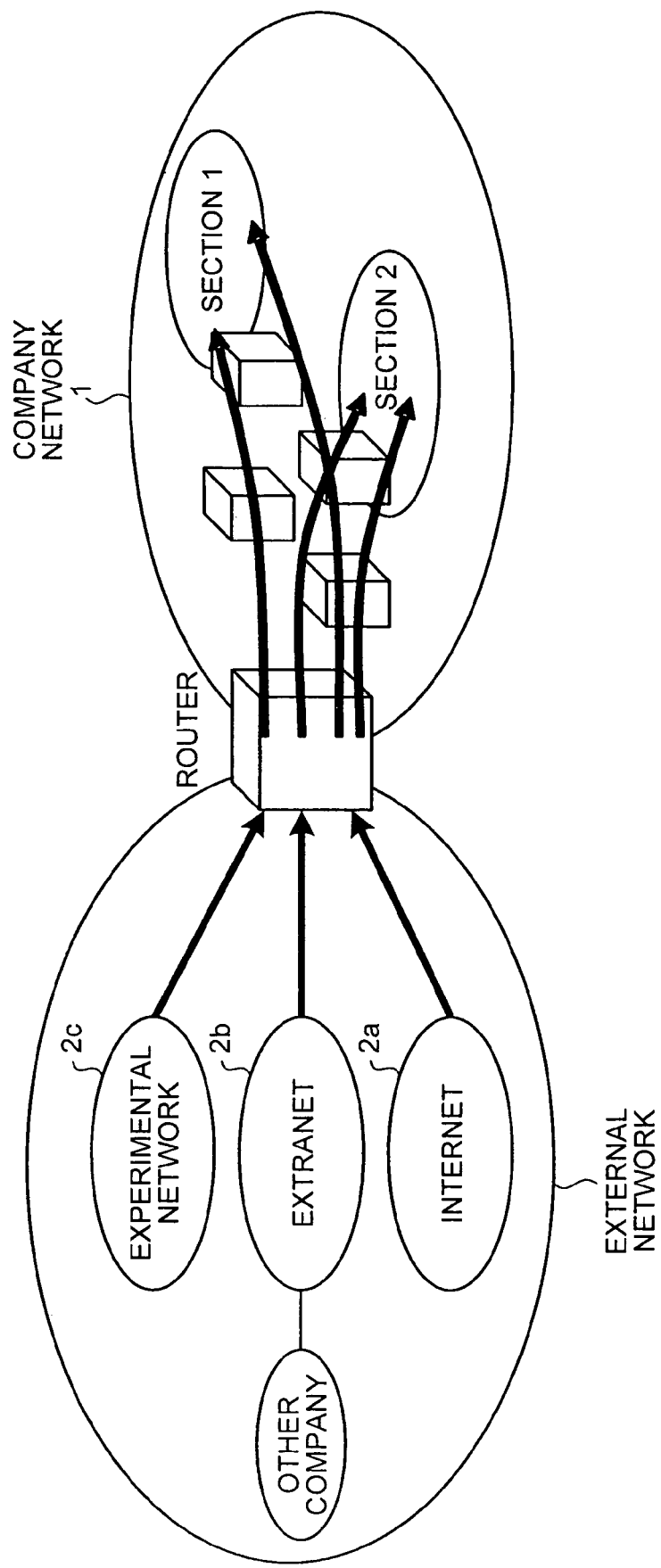
FIG. 20 is a block diagram of an example of data communication that is carried out between a plurality of networks.
Figure 21:
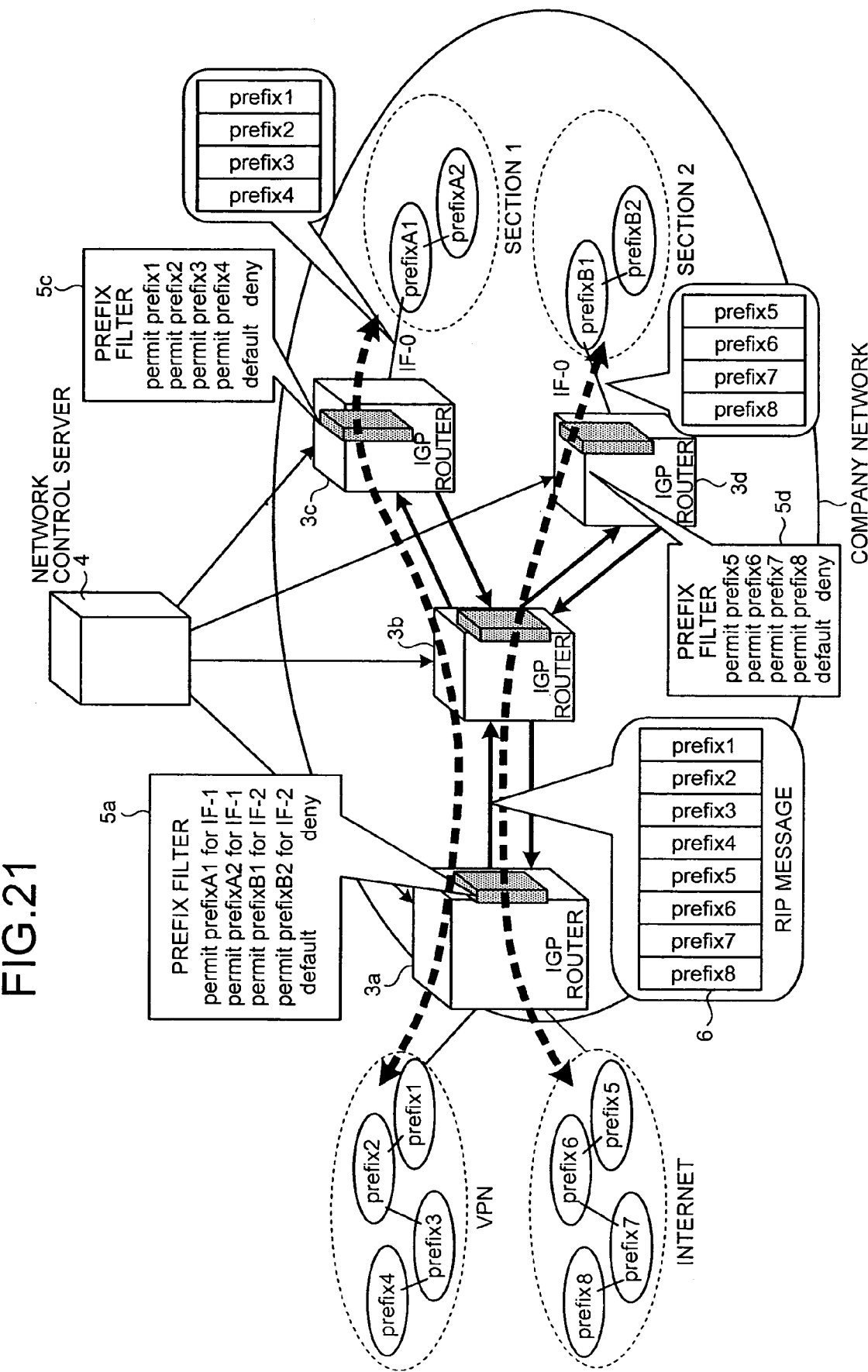
FIG. 21 is a block diagram of a conventional network that uses IGP.
Figure 22:
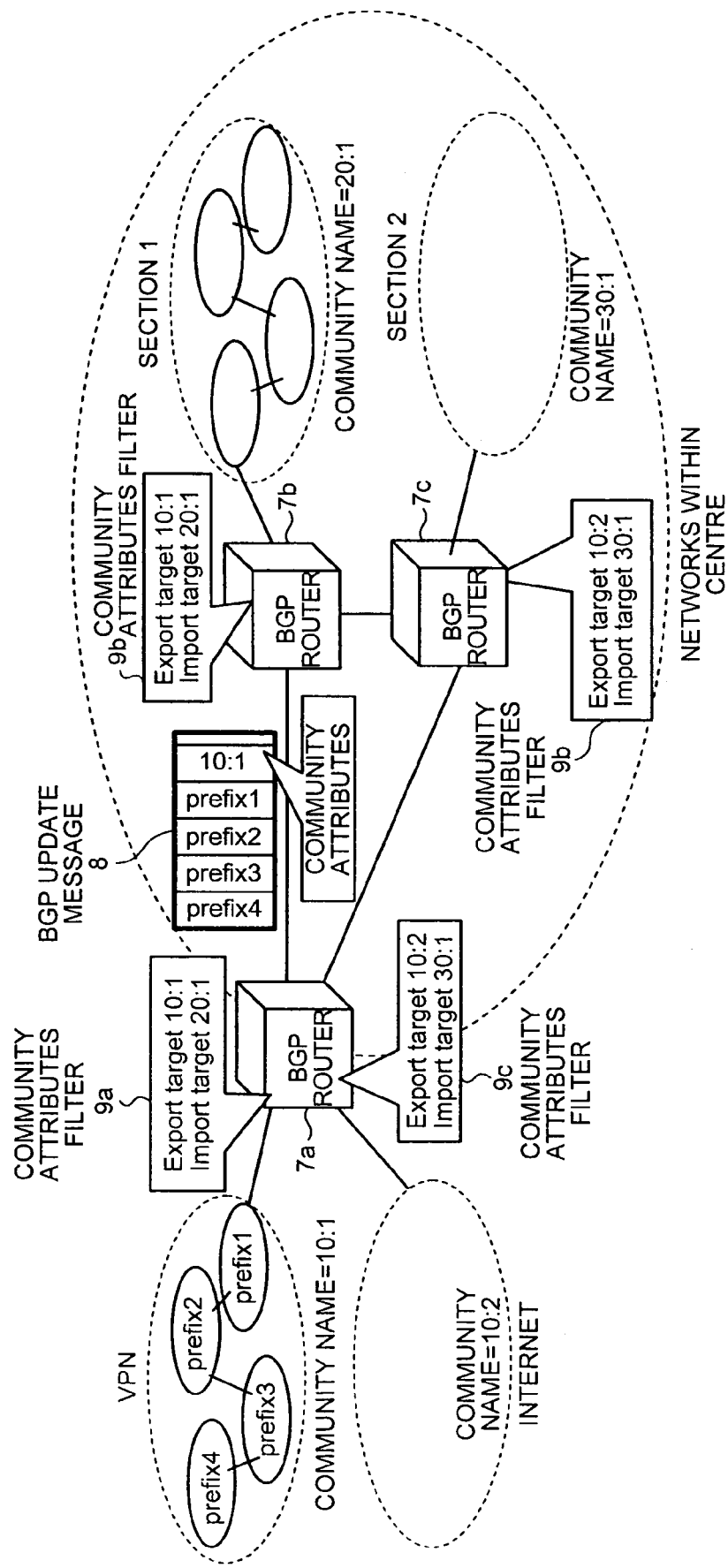
FIG. 22 is a block diagram of the conventional network that uses BGP.

FIG. 13 is a functional block diagram of a functional structure of a community control server 50 according to the second embodiment. As shown in FIG. 13, similarly as the community control server 20 according to the first embodiment, the community control server 50 includes the communication unit 21, the input unit 22, the display unit 23, the storage unit 24, and the controller 25.

However, in addition to the policy defining table 24a, the community defining table 24b, the prefix management table 24c, and the filter control table 24d that are explained in the first embodiment, the storage unit 24 of the community control server 50 according to the second embodiment also includes a router-interface control table 24e and a transit router management table 24f.

The router-interface control table 24e is recorded data related to the communication interfaces that are included in the IGP routers 10a to 10d. FIG. 14 is an example of contents of the router-interface control table 24e. As shown in FIG. 14, data of a router name, an interface name, and an interface address is recorded in the router-interface control table 24e.

The router name is data of names of the IGP routers 10a to 10d. In the example shown in FIG. 14, "router 1", "router 2", "router 3", and "router 4" indicate the IGP router 10a, the IGP router 10b, the IGP router 10c, and the IGP router 10d respectively that are shown in FIG. 1. The interface name indicates names of the communication interfaces included in the IGP routers 10a to 10d. The interface address is data of an address that is allocated to each communication interface.

Returning to FIG. 13, the transit router management table 24f is stored data of the IGP routers 10a to 10d that are routed when the routing message is transmitted from a community to another community.

FIG. 15 is an example of contents of the transit router management table 24f. As shown in FIG. 15, data of an SRC community, a DST community, a transit router, and an interface is recorded in the transit router management table 24f.

The SRC community indicates the community name of a community that is a source of the routing information. The DST community indicates the community name of a community that is a destination of the routing information. The transit router is data of names of the IGP routers 10a to 10d that are routed when the routing information is transmitted from the community that is recorded as the SRC community to the community that is recorded as the DST community. The interface indicates data of the communication interfaces of the IGP routers 10a to 10d that are routed when the routing information is transmitted.

Returning to FIG. 13, in addition to the policy-setting receiving unit 25a, the community controller 25b, the prefix detecting unit 25c, the community/prefix converter 25d, and the filter setting unit 25e that are explained in the first embodiment, the controller 25 includes a transit router detecting unit 25f.

The transit router detecting unit 25f detects the IGP routers 10a to 10d that are routed when the routing information is transmitted from a community to another community. To be specific, the transit router detecting unit 25f treats a distribution source community of the routing information in the policy defining table 24a shown in FIG. 2 as the SRC community, treats a distribution destination community of the routing information as the DST community, and executes a trace-route from the IGP routers among 10a to 10d that connects to the DST community towards the IGP routers among 10a to 10d that connects to the SRC community.

The trace-route is a conventional technology in which the packet is transmitted to a communication device having a predetermined destination address and data of the addresses allocated to the communication interfaces of the IGP routers 10a to 10d that are passed by the packet is notified.

FIG. 16 is a schematic for explaining the trace route. FIG. 17 is an example of contents of an execution result of the trace route. In the example shown in FIG. 16, the trace-route is executed from the communication interface "IF-1" of the IGP router 10c that connects to the community "20:1" towards the communication interface "IF-0" of the IGP router 10a that connects to the community "10:1".

In the example shown in FIG. 16, the packet that is transmitted from the communication interface "IF-1" of the IGP router 10c is received by the communication interface "IF-1" of the IGP router 10b and is further received by the communication interface "IF-2" of the IGP router 10a.

As shown in FIG. 17, an address "10.25.170.1" of the communication interface "IF-1" of the IGP router 10b and an address "10.25.160.1" of the communication interface "IF-2" of the IGP router 10a are obtained as an execution result 60 of the trace-route.

The transit router detecting unit 25f refers to the router-interface control table 24e and converts the obtained data of the addresses into data of the transit routers and the communication interfaces in the transit router management table 24f. The transit router detecting unit 25f records the converted data in the transit router management table 24f by establishing a correspondence with the SRC community and the DST community.

The community/prefix converter 25d refers to the prefix management table 24c, converts the data of the community that permits distribution of the routing information recorded in the policy defining table 24a into the prefix data, and generates data of the filter rule and the filter generating policy that are recorded in the filter control table 24d.

Further, the community/prefix converter 25d refers to the transit router management table 24f, specifies the transit routers and the communication interfaces corresponding to the policy recorded in the policy defining table 24a, and generates data of the router name and the interface that are recorded in the filter control table 24d. The community/prefix converter 25d records data of the router name, the interface, the filter rule, and the filter generating policy in the filter control table 24d.

FIG. 18 is an example of contents of the filter control table 24d that includes the filter data of the transit routers. "Router 2" corresponds to the IGP router 10b that is a transit router shown in FIG. 1. For example, as shown in FIG. 18, for a filtering policy "Put 10:1 to 20:1" of the policy defining table 24a, the same filter rule as the filter rule recorded in the communication interface "IF-1" of "router 3" (the IGP router 10c) is recorded as the filter rule of the communication interface "IF-1" of "router 2".

The filter setting unit 25e refers to the filter control table 24d, transmits the data of the filter rules of the prefixes to each of the IGP routers 10a to 10d including the transit routers, sets the prefix filters 19a to 19c in the IGP routers 10a to 10d, and executes filtering of the routing information and the user data.

In the second embodiment, if the third IGP router 10b is included in a communication path that transmits the routing information from the first IGP routers 10a, 10c, and 10d that are connected to a first community to the second IGP routers 10a, 10c, and 10d that are connected to a second community, the prefix data of the routing information that is permitted to pass is transmitted to the third IGP router 10b. Thus, transmission of unnecessary routing information in the network can be prevented.

The communication control process explained in the first and the second embodiments can be realized by executing a prior formulated program using a computer. Next, an example of the computer that executes the program that realizes the communication control process is explained with reference to FIG. 19.

FIG. 19 is a functional block diagram of a hardware structure of the computer that carries out the communication control process. The computer includes an input device 100 that receives an input of data from a user, a display device 101 that displays data, a medium reader 102 that reads various programs from a recording medium that records various programs, a network interface 103 that carries out transfer of data between the computer and another computer via a network, a random access memory (RAM) 104, a read only memory (ROM) 105, a central processing unit (CPU) 106, and a hard disk (HD) 107. A bus 108 connects the input device 100, the display device 101, the medium reader 102, the network interface 103, the RAM 104, the ROM 105, the CPU 106, and the HD 107.

The HD 107 stores therein computer programs that include the same functions as the functions of the community control server 20. In other words, the HD 107 stores therein a policy-setting receiving program 107b, a community control program 107c, a prefix detecting program 107d, a community/prefix converting program 107e, a filter setting program 107f, and a transit router detecting program 107g.

The policy-setting receiving program 107b, the community control program 107c, the prefix detecting program 107d, the community/prefix converting program 107e, the filter setting program 107f, and the transit router detecting program 107g can be appropriately integrated or broken down and stored.

The policy-setting receiving program 107b, the community control program 107c, the prefix detecting program 107d, the community/prefix converting program 107e, the filter setting program 107f, and the transit router detecting program 107g are read by the CPU 106 from the HD 107 and executed. Thus, a policy-setting receiving process 106a, a community control process 106b, a prefix detecting process 106c, a community/prefix converting process 106d, a filter setting process 106e, and a transit router detecting process 106f start functioning.

The policy-setting receiving process 106a, the community control process 106b, the prefix detecting process 106c, the community/prefix converting process 106d, the filter setting process 106e, and the transit router detecting process 106f correspond respectively to the policy-setting receiving unit 25a, the community controller 25b, the prefix detecting unit 25c, the community/prefix converter 25d, and the filter setting unit 25e that are shown in FIG. 5 or FIG. 13, and the transit router detecting unit 25f that is shown in FIG. 13.

The HD 107 stores therein tables 107a. The tables 107a correspond respectively to the policy defining table 24a, the community defining table 24b, the prefix management table 24c, and the filter control table 24d that are shown in FIG. 5 or FIG. 13 and the router-interface control table 24e and the transit router management table 24f that are shown in FIG. 13.

The CPU 106 stores the tables 107a in the HD 107, reads the tables 107a from the HD 107, stores the read tables 107a in the RAM 104, and based on tables 104a that are stored in the RAM 104 executes data processes.

The policy-setting receiving program 107b, the community control program 107c, the prefix detecting program 107d, the community/prefix converting program 107e, the filter setting program 107f, and the transit router detecting program 107g need not be stored in the HD 107 from the beginning.

For example, various programs can be stored in a "portable physical medium" such as a Flexible Disk (FD), a Compact Disk-Read Only Memory (CD-ROM), a Digital Versatile Disk (DVD), a Magneto Optical (MO) disk, an Integrated Circuit (IC) card etc. that are inserted in the computer, a "fixed physical medium" such as a Hard Disk Drive (HDD) that is included inside or outside the computer, or "another computer (or server)" that is connected to the computer via a public line, the Internet, a Local Area Network (LAN), a Wide Area Network (WAN) etc. The stored programs can be read by the computer from the media and executed.

Although the invention has been described with respect to a specific embodiment for a complete and clear disclosure, various modifications may be made without departing from the spirit or scope of the general inventive concept as defined by the appended claims and their equivalents.

All the automatic processes explained in the present embodiment can be, entirely or in part, carried out manually. Similarly, all the manual processes explained in the present embodiment can be entirely or in part carried out automatically by a known method.

The sequence of processes, the sequence of controls, specific names, and data including various parameters can be changed as required unless otherwise specified.

The constituent elements of the device illustrated are merely conceptual and may not necessarily physically resemble the structures shown in the drawings. For instance, the device need not necessarily have the structure that is illustrated. The device as a whole or in parts can be broken down or integrated either functionally or physically in accordance with the load or how the device is to be used.

The process functions performed by the apparatus are entirely or partially realized by the CPU or a program executed by the CPU or by a hardware using wired logic.

According to an aspect of the present invention, path control can be efficiently carried out while using a technology such as the IGP that is commonly used in a company network even if a destination address is modified.

According to another aspect of the present invention, by discarding outdated data, path control based on incorrect data can be prevented.

According to still another aspect of the present invention, if a second communication device in a second network is included in a communication path that is used to transmit routing information from a first communication device connected to a first network to a third communication device connected to a third network, filter conditions of the generated routing information are set in the second communication device. Thus, transmission of unnecessary routing information in a network can be curbed.

According to still another aspect of the present invention, the communication devices receive data of the transmitted destination address and based on the received data carry out filtering of the routing information. Thus, even if data of the destination address is leaked to a third party in any way, transmission of packets of user data to the network of the destination address from a network that is not permitted to carry out such a communication can be prevented.

According to still another aspect of the present invention, a device that is included separately from the communication devices detects the destination address from the routing information, and collects data of the communication devices that have received the routing information that includes data related to the destination address detected by the device and data of the destination address. Thus, by separately including the communication devices and a detecting device of the destination address, the communication devices that do not include a detecting function of the destination address can be used.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication control system that includes at least a communication device and a server in a first network, a second network, and a third network, wherein the first network distributes a path message that includes routing information consisting of an address of a network that is a destination and identification data of routing communication devices to the network, and the second network relays a communication packet between the first network and the third network, the communication control system comprising:
    a storage unit that stores therein, upon the communication device connected to the first and the second networks receiving the path message from the first network that includes the routing information towards the destination network, a community name that represents a community of destination network addresses that are treated in the same way in the second network and a definition of an addition rule of the routing information that is added to the community;
    a collecting unit that collects from the communication device, the destination network address that is included in the path message that is received by the communication device from the first network and identification data of the communication device and an interface that have received the path message;
    a correspondence data generating unit that generates, based on the community name and the addition rule of the routing information added to the community that are stored by the storage unit and data that is collected by the collecting unit, correspondence data of the community name and the destination network address that satisfies the addition rule to the community;
    a filter conditions generating unit that receives a path distribution rule, of the routing information included in the community towards the third network, as conditions for the community and converts, based on the correspondence data generated by the correspondence data generating unit, the path distribution rule into filter conditions of the routing information to be set in the interface of the communication device that is included in the second network, the filter conditions being conditions for controlling filtering of the path message including the routing information; and
    a setting unit that sets in the communication device, the filter conditions of the routing information that are generated by the filter conditions generating unit.

2. The communication control system according to claim 1, wherein the correspondence data generating unit discards, upon time after collection of the routing information by the collecting unit exceeding a predetermined time period, the correspondence data, of the community and the destination network address that satisfies the addition rule to the community, that is generated from the routing information.

3. The communication control system according to claim 1, wherein the setting unit sets in a second communication device, upon the second communication device in the second network being in a communication path whereby the routing information is transmitted from a first communication device connected to the first network to a second communication device connected to the second network, the filter conditions of the routing information that are generated by the filter conditions generating unit.

4. The communication control system according to claim 1, wherein
    the setting unit sets in the communication device, the filter conditions of the routing information by transmitting data of the destination network address; and
    the communication device includes a filtering unit that carries out filtering of packets of user data based on received data.

5. The communication control system according to claim 1, further comprising:
    a destination network address detecting unit that is included separately from the communication controller and that detects the destination address from the routing message, wherein
    the collecting unit collects, data related to the destination network address that is detected by the destination network address detecting unit and the identification data of the communication device and a receiving interface that have received the routing message that includes the data of the destination network address.

6. A communication control method that causes a communication control system, that includes at least a communication device and a server in of a first network, a second network, and a third network, wherein the first network distributes a path message that includes routing information consisting of an address of a network that is a destination and identification data of routing communication devices to the network, and the second network relays a communication packet between the first network and the third network, to carry out communication control, the communication control method comprising:
    collecting from the communication device, the destination network address that is included in the path message that is received by the communication device from the first network and identification data of the communication device and an interface that have received the path message;

correspondence data generating that generates, based on data of a community name that represents, upon the communication device connected to the first and the second networks receiving the path message from the first network that includes the routing information towards the destination network, a community of destination network addresses that are treated in the same way in the second network, a prior stored definition of an addition rule of the routing information that is added to the community, and data that is collected at the collecting, correspondence data of the community name and the destination network address that satisfies the addition rule to the community;

filter conditions generating that receives a path distribution rule, of the routing information included in the community towards the third network, as conditions for the community and converts, based on the correspondence data generated at the correspondence data generating, the path distribution rule into filter conditions of the routing information to be set in the interface of the communication device that is included in the second network, the filter conditions being conditions for controlling filtering of the path message including the routing information; and setting that sets in the communication device, the filter conditions of the routing information that are generated at the filter conditions generating.

7. A computer-readable recording medium that stores therein a communication control program that causes a communication control system, that includes at least a communication device and a server in a first network, a second network, and a third network, wherein the first network distributes a path message that includes routing information consisting of an address of a network that is a destination and identification data of routing communication devices to the network, and the second network relays a communication packet between the first network and the third network, to carry out communication control, the communication control program causing a computer to execute:

collecting from the communication device, the destination network address that is included in the path message that is received by the communication device from the first network and identification data of the communication device and an interface that have received the path message;

correspondence data generating that generates, based on data of a community name that represents, upon the communication device connected to the first and the second networks receiving the path message from the first network that includes the routing information towards the destination network, a community of destination network addresses that are treated in the same way in the second network, a prior stored definition of an addition rule of the routing information that is added to the community, and data that is collected at the collecting, correspondence data of the community name and the destination network address that satisfies the addition rule to the community;

filter conditions generating that receives a path distribution rule, of the routing information included in the community towards the third network, as conditions for the community and converts, based on the correspondence data generated at the correspondence data generating, the path distribution rule into filter conditions of the routing information to be set in the interface of the communication device that is included in the second network, the filter conditions being conditions for controlling filtering of the path message including the routing information; and setting that sets in the communication device, the filter conditions of the routing information that are generated at the filter conditions generating.

* * * * *

UNITED STATES PATENT AND TRADEMARK OFFICE
CERTIFICATE OF CORRECTION

PATENT NO. : 7,684,339 B2  Page 1 of 1
APPLICATION NO. : 11/602688
DATED : March 23, 2010
INVENTOR(S) : Naoki Oguchi et al.

It is certified that error appears in the above-identified patent and that said Letters Patent is hereby corrected as shown below:

Claim 6 column 20, line 56: "in of a first network" should be changed to --in a first network--.

Signed and Sealed this

Eighteenth Day of May, 2010

David J. Kappos
*Director of the United States Patent and Trademark Office*